(12) United States Patent
Ellanti et al.

(10) Patent No.: US 8,635,290 B2
(45) Date of Patent: Jan. 21, 2014

(54) COMMUNICATION SYSTEM WITH TEMPORAL AND SPATIAL ANTI-SPAM MECHANISM AND METHOD OF OPERATION THEREOF

(75) Inventors: Manohar Ellanti, Fremont, CA (US); HaiPing Jin, San Jose, CA (US); Shawn Timothy Carolan, Los Altos, CA (US)

(73) Assignee: Telenav, Inc., Sunnyvale, CA (US)

( * ) Notice: Subject to any disclaimer, the term of this patent is extended or adjusted under 35 U.S.C. 154(b) by 602 days.

(21) Appl. No.: 12/880,093

(22) Filed: Sep. 11, 2010

(65) Prior Publication Data

US 2011/0066690 A1 Mar. 17, 2011

Related U.S. Application Data

(60) Provisional application No. 61/241,815, filed on Sep. 11, 2009.

(51) Int. Cl.
*G06F 15/16* (2006.01)

(52) U.S. Cl.
USPC .......................................... 709/206; 709/200

(58) Field of Classification Search
USPC .................................................. 709/200, 206
See application file for complete search history.

(56) References Cited

U.S. PATENT DOCUMENTS

| | | | |
|---|---|---|---|
| 5,508,940 A | 4/1996 | Rossmere et al. | |
| 5,539,392 A * | 7/1996 | Hays et al. | 340/7.25 |
| 5,819,180 A * | 10/1998 | Alperovich et al. | 455/465 |
| 6,421,709 B1 | 7/2002 | McCormick et al. | |
| 6,665,613 B2 * | 12/2003 | Duvall | 701/485 |
| 6,779,021 B1 * | 8/2004 | Bates et al. | 709/206 |
| 6,988,128 B1 * | 1/2006 | Alexander et al. | 709/206 |
| 7,155,484 B2 | 12/2006 | Malik | |
| 7,305,437 B2 * | 12/2007 | Horvitz et al. | 709/204 |
| 7,321,920 B2 * | 1/2008 | Washburn | 709/206 |
| 7,327,250 B2 * | 2/2008 | Harvey | 340/539.13 |
| 7,327,258 B2 | 2/2008 | Fast et al. | |
| 7,366,919 B1 | 4/2008 | Sobel et al. | |
| 7,489,939 B2 | 2/2009 | Ashley et al. | |
| 7,493,211 B2 | 2/2009 | Breen | |
| 7,577,654 B2 | 8/2009 | Brants et al. | |
| 7,711,779 B2 * | 5/2010 | Goodman et al. | 709/206 |
| 7,756,929 B1 * | 7/2010 | Pettigrew et al. | 709/206 |
| 7,801,956 B1 * | 9/2010 | Cumberbatch et al. | 709/204 |
| 7,848,765 B2 | 12/2010 | Phillips et al. | |
| 7,925,708 B2 * | 4/2011 | Davis et al. | 709/206 |
| 7,983,963 B2 * | 7/2011 | Byrne et al. | 705/27.2 |
| 8,185,597 B1 * | 5/2012 | Cumberbatch et al. | 709/206 |
| 8,325,025 B2 * | 12/2012 | Morgan et al. | 340/426.19 |
| 8,362,887 B2 * | 1/2013 | Morgan et al. | 340/426.19 |
| 2002/0018492 A1 | 2/2002 | Sakai et al. | |

(Continued)

OTHER PUBLICATIONS

Ludford et al., "Because I Carry My Cell Phone Anyway: Functional Location-Based Reminder Applications", CHI 2006 Proceedings, Everyday Use of Mobiles, Apr. 22-27, 2006, pp. 889-898.*

(Continued)

*Primary Examiner* — Anthony Mejia
(74) *Attorney, Agent, or Firm* — IP Investment Law Group

(57) ABSTRACT

A method of operation of a communication system includes: establishing a geofence; setting a reception time period; and receiving a message originating within the geofence and within the reception time period for displaying on a device.

16 Claims, 7 Drawing Sheets

(56) References Cited

U.S. PATENT DOCUMENTS

| | | |
|---|---|---|
| 2003/0105826 A1* | 6/2003 | Mayraz ............... 709/206 |
| 2004/0122900 A1* | 6/2004 | Pous et al. ............ 709/206 |
| 2005/0156715 A1* | 7/2005 | Zou et al. ............ 340/426.19 |
| 2005/0159863 A1 | 7/2005 | Howard et al. |
| 2005/0242971 A1 | 11/2005 | Dryer |
| 2006/0007039 A1 | 1/2006 | Duvall |
| 2006/0011721 A1 | 1/2006 | Olsen et al. |
| 2006/0031464 A1* | 2/2006 | Bowman et al. ........ 709/224 |
| 2006/0073857 A1 | 4/2006 | Hanabusa et al. |
| 2006/0099969 A1 | 5/2006 | Staton et al. |
| 2006/0099971 A1 | 5/2006 | Staton et al. |
| 2006/0181411 A1 | 8/2006 | Fast et al. |
| 2006/0234727 A1 | 10/2006 | Ashley et al. |
| 2006/0270421 A1 | 11/2006 | Phillips et al. |
| 2007/0161382 A1* | 7/2007 | Melinger et al. ......... 455/456.1 |
| 2007/0185728 A1* | 8/2007 | Schwarz et al. ........ 705/1 |
| 2007/0210936 A1 | 9/2007 | Nicholson |
| 2007/0244977 A1* | 10/2007 | Atkins ............... 709/206 |
| 2007/0296574 A1 | 12/2007 | Smith et al. |
| 2008/0005071 A1* | 1/2008 | Flake et al. .......... 707/3 |
| 2008/0052757 A1 | 2/2008 | Gulati et al. |
| 2008/0071874 A1* | 3/2008 | Roodman et al. ....... 709/206 |
| 2008/0086323 A1 | 4/2008 | Petrie et al. |
| 2008/0086497 A1 | 4/2008 | Wallace et al. |
| 2008/0129491 A1 | 6/2008 | Ruperto |
| 2008/0133302 A1* | 6/2008 | Brauninger et al. ...... 705/8 |
| 2008/0143604 A1 | 6/2008 | Mock et al. |
| 2008/0147809 A1* | 6/2008 | Byers et al. ........... 709/206 |
| 2008/0147812 A1* | 6/2008 | Curtis ............... 709/206 |
| 2008/0167896 A1 | 7/2008 | Fast et al. |
| 2008/0174485 A1 | 7/2008 | Carani et al. |
| 2008/0183485 A1 | 7/2008 | Drabble et al. |
| 2008/0238769 A1 | 10/2008 | Verechtchiagine |
| 2008/0252487 A1 | 10/2008 | McClellan et al. |
| 2008/0268869 A1 | 10/2008 | Lamba et al. |
| 2008/0276318 A1* | 11/2008 | Leung et al. .......... 726/23 |
| 2008/0281518 A1 | 11/2008 | Dozier et al. |
| 2008/0305779 A1 | 12/2008 | Wright et al. |
| 2008/0305808 A1 | 12/2008 | Chan et al. |
| 2009/0009321 A1* | 1/2009 | McClellan et al. ...... 340/539.13 |
| 2009/0009357 A1 | 1/2009 | Heen et al. |
| 2009/0018929 A1 | 1/2009 | Weathers |
| 2009/0027223 A1 | 1/2009 | Hill |
| 2009/0037546 A1* | 2/2009 | Kirsch ............... 709/206 |
| 2009/0082139 A1 | 3/2009 | Hart |
| 2009/0093958 A1 | 4/2009 | Wang et al. |
| 2009/0131080 A1* | 5/2009 | Nadler et al. ......... 455/456.3 |
| 2009/0253513 A1* | 10/2009 | Ducheneaut et al. ..... 463/42 |
| 2009/0287783 A1* | 11/2009 | Beare et al. .......... 709/206 |
| 2010/0148947 A1* | 6/2010 | Morgan et al. ........ 340/426.22 |
| 2010/0211592 A1* | 8/2010 | Brownlee ............ 707/769 |
| 2010/0250682 A1* | 9/2010 | Goldberg et al. ....... 709/206 |
| 2010/0262449 A1 | 10/2010 | Monteforte et al. |
| 2011/0060796 A1* | 3/2011 | Grigsby et al. ........ 709/206 |
| 2011/0066366 A1 | 3/2011 | Ellanti et al. |
| 2011/0066717 A1* | 3/2011 | Ahola ............... 709/224 |
| 2011/0070872 A1 | 3/2011 | Ellanti et al. |
| 2011/0145273 A1* | 6/2011 | Kolathaya et al. ...... 707/769 |
| 2013/0029696 A1 | 1/2013 | Ellanti et al. |
| 2013/0110948 A1* | 5/2013 | Davis et al. .......... 709/206 |

OTHER PUBLICATIONS

Karimi et al., "SoNavNet: A Framework for Social Navigation Networks", Geoinformatics Laboratory, University of Pittsburgh, 2009, pp. 81-87.*

International Search Report for Application No. PCT/US2010/048552 dated Nov. 2, 2010.

U.S. Appl. No. 12/880,091, filed Sep. 11, 2010, Ellanti et al.
U.S. Appl. No. 12/880,096, filed Sep. 11, 2010, Ellanti et al.

* cited by examiner

COMMUNICATION SYSTEM WITH TEMPORAL AND SPATIAL ANTI-SPAM MECHANISM AND METHOD OF OPERATION THEREOF

CROSS-REFERENCE TO RELATED APPLICATION

This application claims the benefit of U.S. Provisional Patent Application Ser. No. 61/241,815 filed Sep. 11, 2009, and the subject matter thereof is incorporated herein by reference thereto.

TECHNICAL FIELD

The present invention relates generally to a communication system, and more particularly to a system for limiting SPAM in communication systems.

BACKGROUND ART

Modern portable consumer and industrial electronics, especially client devices such as communication systems, cellular phones, portable digital assistants, and combination devices are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Messaging, such as electronic mail (email) or Short Messaging Service (SMS) or other electronics means, includes unsolicited, unanticipated, or even offensive messages that clutter user's inbox. In some cases, such as in SMS, it incurs extra cost for the user.

Solutions to these problems have been long sought but prior developments have not taught or suggested any solutions and, thus, solutions to these problems have long eluded those skilled in the art. Thus, a need still remains for a communication system with temporal and spatial anti-SPAM mechanism.

DISCLOSURE OF THE INVENTION

The present invention provides a method of operation of a communication system including: establishing a geofence; setting a reception time period; and receiving a message originating within the geofence and within the reception time period for displaying on a device.

The present invention provides a communication system, including: a geofence module for establishing a geofence; a reception time-window module, coupled to the geofence module, for setting a reception time period; and a message reception module, coupled to the reception time-window module, for receiving a message originating within the geofence and within the reception time period for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
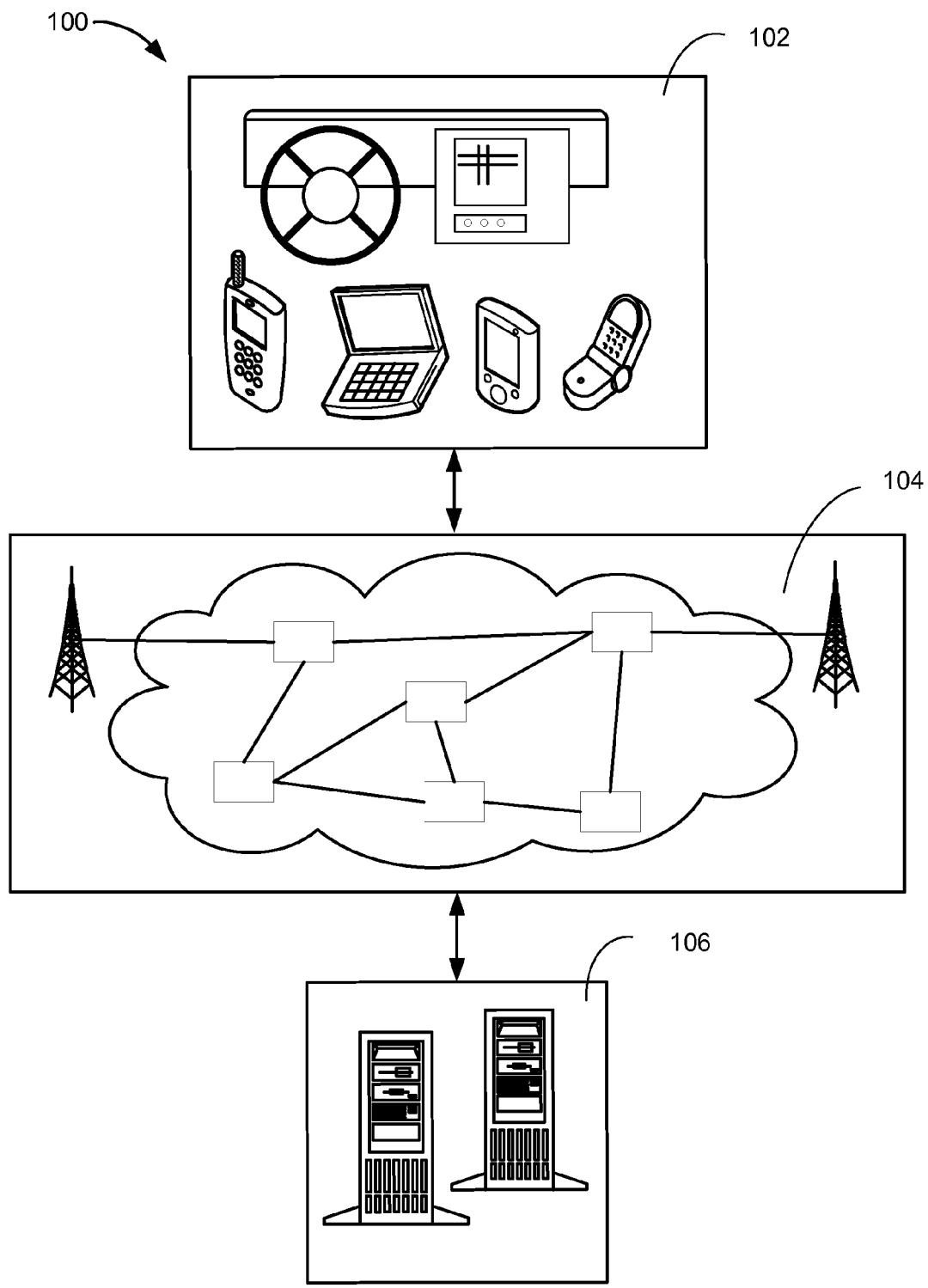
FIG. 1 is a communication system with temporal and spatial anti-SPAM mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X,Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "SPAM" referred to herein means unwanted electronic communication, including unwanted audio-messages, electronic mails, text messages, video messages, or multimedia messages.

Referring now to FIG. 1, therein is shown a communication system 100 with temporal and spatial anti-SPAM mechanism in a first embodiment of the present invention. The communication system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic communication system, navigation device, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the communication system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the communication system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the communication system 100 is shown with the second device 106 and the first device 102 as end points of the communication path 104, although it is understood that the communication system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
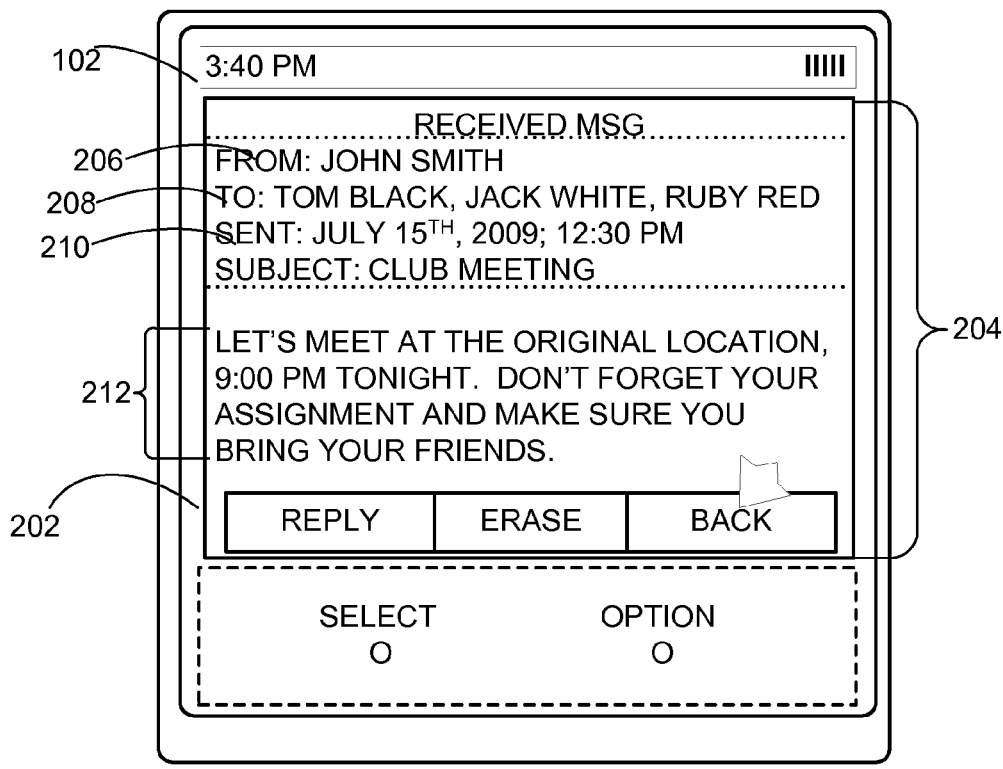
FIG. 2 is a first example of a display interface of the first device.

Referring now to FIG. 2, therein is shown a first example of a display interface 202 of the first device 102. The display interface 202 can show a message 204, a message sender 206, a message recipient 208, a message sent time 210 and a message content 212.

The message 204 represents the communication between users of the communication system 100. The message 204 can be spoken, written, pictorial, or video communication. For example, the message 204 can include voice mail, short message system (SMS), or electronic mail (e-mail). The message 204 can include header contents such as the message sender 206 and the message sent time 210, along with the message content 212.

The message sender 206 represents the identity of the message source. The message sender 206 can be a person, entity, or a machine that sent the message. For example, the message sender 206 can include a vendor sales representative sending a SMS, an automated appointment reminder system leaving a voice mail, or a company sending an email, all of which are examples of the message 204.

The message recipient 208 represents the identity of the person or entity the message sender 206 intends to communicate with. The message recipient 208 can be represented by a name, an email address, a phone number, a pseudo-name, or a nickname.

The message sent time 210 represents the time when the message sender 206 sent the message 204. The message sent time 210 can be represented in a number of different formats or with different relational information. For example, the message sent time 210 can be represent with date and time information and format as Jul. 15, 2009, 12:30 pm. The message sent time 210 can also be represented relative to the current date or time, such as "yesterday" or "an hour ago." The message sent time 210 can also be represented relative to an event, such as "Day Two" of the conference.

The message content 212 represents the content of the communication between the message sender 206 and the message recipient 208. The message content 212 can be the matter of the written, spoken, or depicted communication.

For example, the message content 212 can include sound recording, written text, or a picture.

Figure 3:
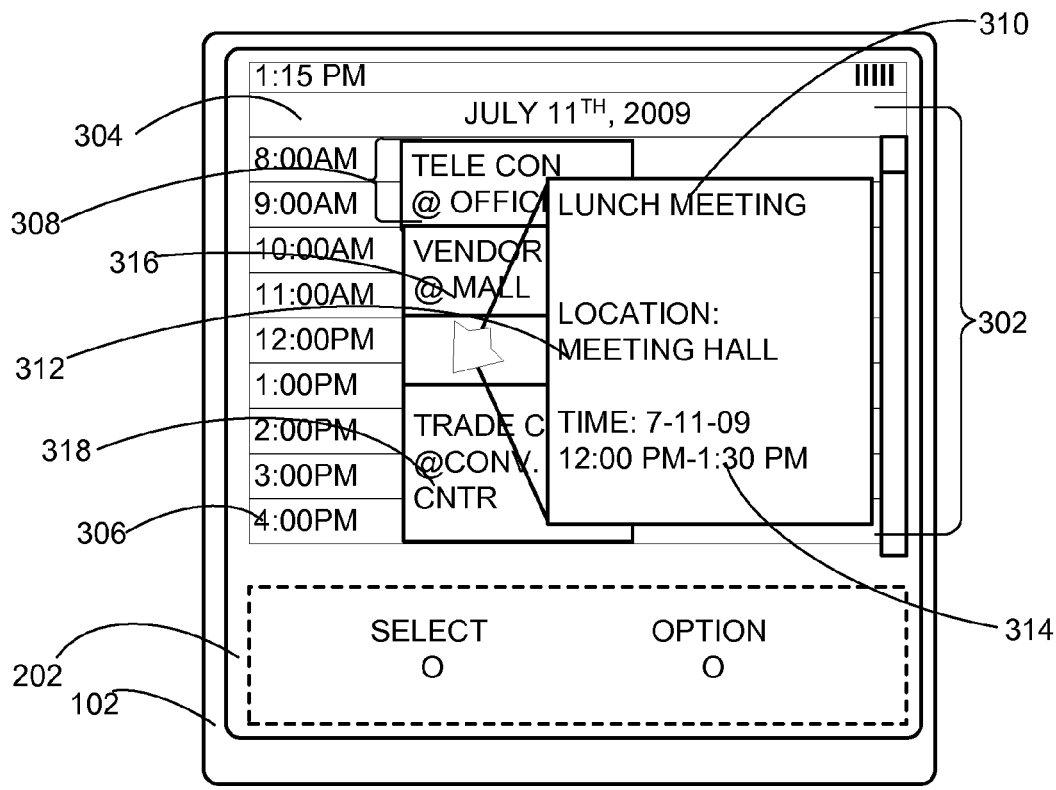
FIG. 3 is a second example of the display interface.

Referring now to FIG. 3, therein is shown a second example of the display interface 202. The display interface 202 can display a remote calendar 302, which can be used to determine the location of the source at various times.

The remote calendar 302 is a representation of time and scheduled events of the message sender 206 of FIG. 2. For example, the remote calendar 302 can be an electronic calendar, such as Microsoft Outlook™, or a booklet including the tide schedule. The remote calendar 302 can have a calendar date 304, a time segment 306, a calendar event 308, an event context 310, an event location 312, an event time period 314, a source prior location 316, and a source future location 318.

The calendar date 304 represents a date within the remote calendar 302. The time segment 306 divides up the time represented in the calendar date 304. For example, the time segment can be a minute, an hour, a day, a week, or combination thereof.

The calendar event 308 represents a scheduled event or a tentatively scheduled event. The calendar event 308 can represent a meeting, a task, or a reminder. For example, the calendar event 308 can be teleconference with a vendor or a reminder to attend a trade conference. The calendar event 308 can have the event context 310, the event location 312, and the event time period 314.

The event context 310 is the purpose of the calendar event 308. For example, the event context 310 can be the title of the calendar event, such as "Lunch Meeting" or Trade Conference. Also, for example, the event context 310 can represent the type, goal, or desired attendee for the meeting.

The event location 312 represents the geographic location, a virtual location, or contact information such as a conference call number for the calendar event 308. For example, the event location 312 can be set by selecting an address, cross streets, a famous landmark, or longitude and latitude coordinates. The event location 312 can also represent a location in a virtual world.

The source prior location 316 represents where the message sender 206 is scheduled to be before a designated time. The source prior location 316 can be represented by an address, cross streets, famous landmark, longitude and latitude coordinates, or a location in a virtual world. For example, in relation to the lunch meeting occurring on Jul. 11, 2009, between 12:00 pm to 1:30 pm, the source prior location 316 can be the mall, where the meeting with the vendor scheduled between 10:00 am and 12:00 pm.

Similarly, the source future location 318 represents where the message sender 206 is scheduled to be after a designated time. For example, in relation to the lunch meeting occurring on Jul. 11, 2009, between 12:00 pm to 1:30 pm, the source future location 318 can be the convention center, where the message sender 206 is scheduled to attend the trade conference from 1:30 pm to 4:00 pm.

Figure 4:
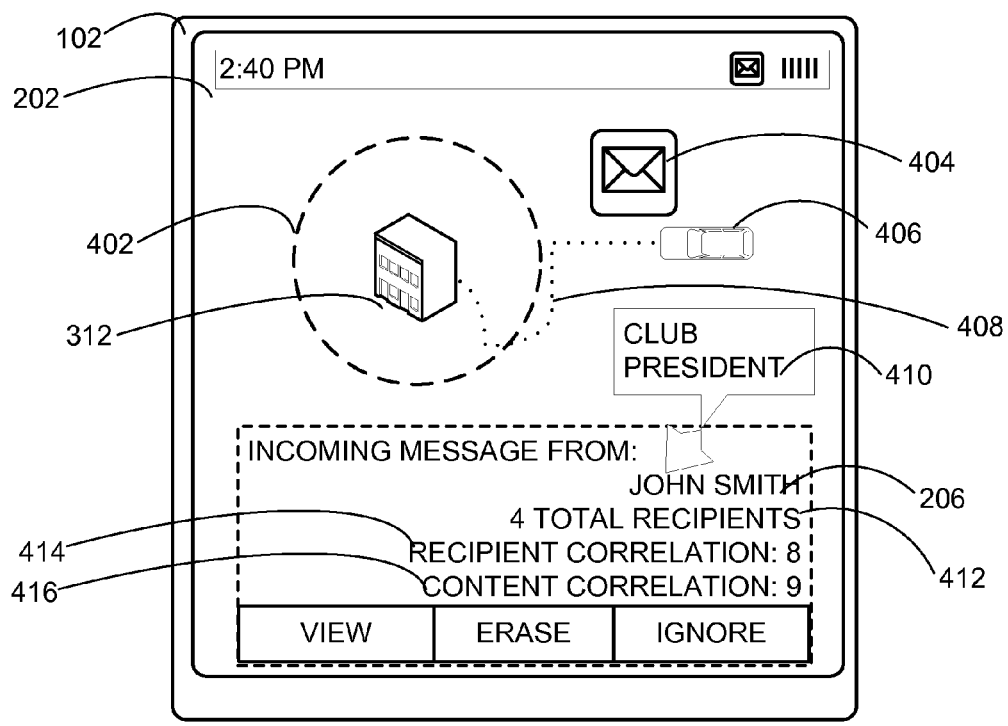
FIG. 4 is a third example of the display interface.

Referring now to FIG. 4, therein is shown a third example of the display interface 202. The display interface 202 can represent various locations with various informational overlays of the communication system 100. For example, the display interface 202 can represent a geofence 402, a message origination point 404, a sender location 406, a sender travel route 408, along with the event location 312.

The geofence 402 represents a navigation boundary for evaluating whether the message 204 of FIG. 2 is acceptable for the message recipient 208 of FIG. 2. The geofence 402 represents a navigation boundary by enclosing a region with a continuous line, without any disconnects. For example, the geofence 402 can be country borders, building outline, zoning boundaries, conference boundaries, or portions thereof.

The event location 312 can be used to define the geofence 402. For example, with the event location 312 set as an address to a house, the geofence 402 can represent a region around the house, the house itself, or a subset of the house.

The geofence 402 can be designated in a number of geometric shapes or configuration. The geofence 402 can be configured by selecting a radial distance from the event location 312. For example, the geofence 402 can be selected as a 25-foot radius or a 9-meter radius around the house.

Also, the geofence 402 can be configured as a user-defined region depicted on the display interface 202. The geofence 402 can be configured to cover a user-defined shape. For example, the geofence 402 can be configured in a geometric shape of a circle, a square, a polygon, or a user-drawn shape. The geofence 402 can be customized to cover the contours of a house, a structure, or a user-selected region.

The message origination point 404 represents the location where the message sender 206 of FIG. 2 sent the message 204. The message origination point 404 can be represented by an address, cross streets, famous landmark, longitude and latitude coordinates, or a virtual location. The message origination point 404 can be obtained using GPS, cellular tower triangulation, or a tracking signal.

The message origination point 404 can also represent the location of the entry point of the message, such as a computer, gateway, router, cell tower, service station, or a server. For example, the message origination point 404 can be the location of the computer kiosk in an airport, the first cell tower, or the first service station used to send the message 204.

The sender location 406 represents the current physical location of the message sender 206. The message origination point 404 and the sender location 406 can be identical. For example, if the message sender 206 sent the message 204 from the first device 102 in their possession, the message origination point 404 and the sender location 406 is identical until the message sender 206 moves. The sender location 406 and the message origination point 404 may not be identical, such as when the sender location 406 is unobtainable or sent from a virtual world.

The sender travel route 408 represents the route for the message sender 206 to traverse from a previous location to a future location. Either the origin or the destination can be the event location 312, and the sender location 406 can be within the sender travel route 408. For example, the sender travel route 408 can include a terrestrial route, a water route, an air route, or a combination thereof.

The display interface 202 can also represent a source characteristic 410, a total recipient count 412, a recipient correlation 414, and a content correlation 416. The source characteristic 410 is the identifiable trait or description of the message sender 206. The source characteristic 410 can be a job title, employer information, classification, field of interest, or a common acquaintance. For example, the source characteristic 410 can be club president, club president's friend, or amateur athlete. The source characteristic 410 can be assigned a unique value, an identifying attribute, or a combination thereof.

The total recipient count 412 represents a count for the message recipient 208 of FIG. 2 included in the message 204. The total recipient count 412 is equivalent to the number of times the message 204 will be sent to the message recipient 208 that is uniquely specified in the message 204. The recipient correlation 414 represents how the unique destinations of the message 204 are related to each other.

The recipient correlation 414 can be evaluated by looking for similarities amongst the unique destinations of the message 204. The recipient correlation 414 can be represented by a calculated number or with a known scale, such as a scale of one through ten or low, medium, and high. The details of evaluating the recipient correlation 414 will be discussed in detail below.

The content correlation 416 represents correlation between the elements of the message content 212 of FIG. 2. The content correlation 416 can be evaluated by looking at the items within the message content 212 or between a series thereof.

For example, when the message content 212 is a series of words, such as an e-mail or SMS, the content correlation 416 represents the correlation between the words or between a stream of related series of the message 204. Also, for example, when the message content 212 is a series of pictures found on the World Wide Web, the content correlation 416 represents the similarity or relationship between the pictures, title, source, or combination thereof.

The content correlation 416 can be represented by a calculated number or with a known scale, such as a scale of one through ten or low, medium, and high. The details of evaluating the content correlation 416 will be discussed in detail below.

Figure 5:
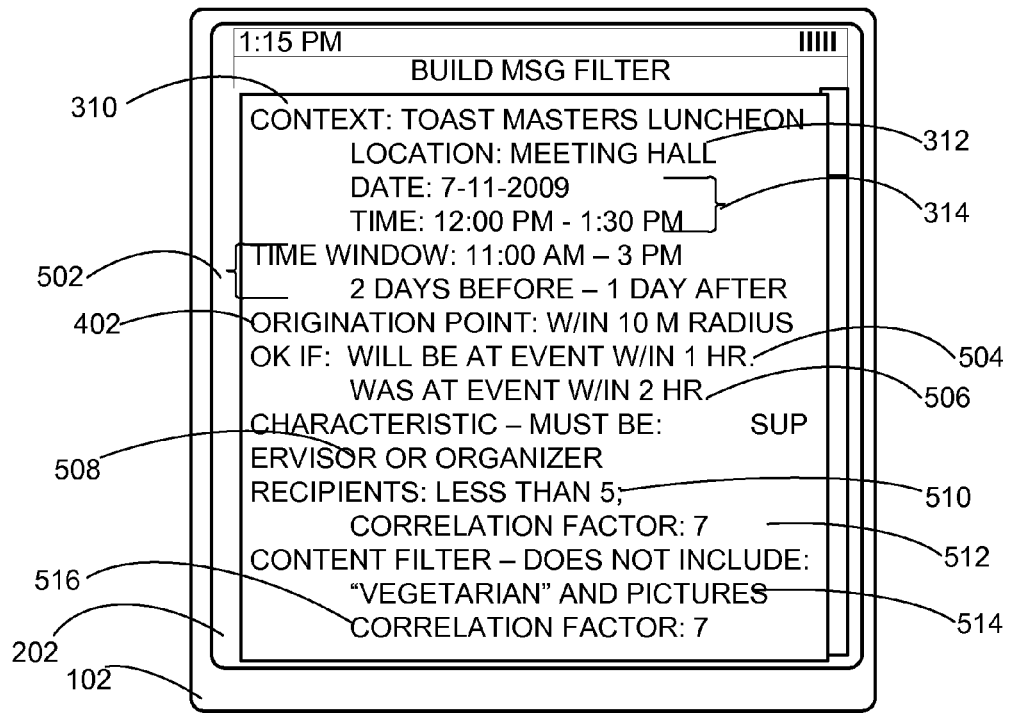
FIG. 5 is a fourth example of the display interface.

Referring now to FIG. 5, therein is shown a fourth example of the display interface 202. The display interface 202 can represent the details of the filter based on context, which can include a reception time period 502, a future grace period 504, a past grace period 506, a pre-defined characteristic set 508, a recipient count limit 510, a recipient correlation limit 512, a content filter item 514, and a content correlation limit 516.

The reception time period 502 defines a time period when the message 204 of FIG. 2 will be received. The reception time period 502 can be a period of time within one day, a block of days, or combination thereof. The reception time period 502 can designate receiving the message 204 within the reception time period 502.

For example, when the reception time period 502 is 11:00 am to 3:00 pm, only the message 204 arriving between 11:00 am and 1:30 pm, such as 12:30 pm, would be received. Also, for example, the reception time period 502 can be set to the first week of January or between 11:00 am and 1:30 pm each day, or between 11:00 am and 1:30 pm only for the first week of January.

The reception time period 502 can also represent a period of time surrounding the event context 310. The reception time period 502 can have select time before and after the event time period 314. For example, for a lunch meeting occurring on Jul. 11, 2009, between 12:00 pm and 1:30 pm, the reception time period 502 can be 11:00 am to 3:00 pm each day, from two days before to a day after the luncheon.

The reception time period 502 can be selected or adjusted. The details of selecting, adjusting, and comparing of the reception time period 502 will be discussed below.

The future grace period 504 is for receiving the message 204 coming from the message sender 206 of FIG. 2 that will be within the geofence 402 within a period of time. For example, the message 204 coming from a meeting participant, who is running 9 minutes late, can be received using the future grace period 504.

The future grace period 504 can be compared against the time necessary for the message sender 206 to arrive at the event location 312. For example, the future grace period 504 can be set to one hour to receive the message 204 from the message sender 206 that will arrive at the event location 312 30 minutes from the message sent time 210 of FIG. 2. Details of such determination and comparison will be discussed below.

The past grace period 506 is for receiving the message 204 coming from the message sender 206 that was within the geofence 402 within a period of time. For example, the message 204 coming from a meeting participant, who stepped out of the convention center for lunch 9 minutes ago, can be received using the past grace period 506.

The past grace period 506 can be compared against the time the message sender 206 has been away from the event location 312. For example, the past grace period 506 can be set to two hours to receive the message 204 from the message sender 206 who was at the event location until one hour before the message sent time 210. Details of such determination and comparison will be discussed below.

The pre-defined characteristic set 508 is a trait or quality required of the message sender 206 for receiving the message 204. The pre-defined characteristic set 508 can be compared against the source characteristic 410 of FIG. 4. For example, the pre-defined characteristic set 508 can be a job description, job title, age, hobby, or combination thereof. Detailed use of the pre-defined characteristic set 508 will be discussed below.

The recipient count limit 510 is a maximum number of times the message 204 can be sent for the message 204 to be received. The recipient count limit 510 can represent a limit set for blocking mass messages. For example, the user can elect to accept messages having five or less recipients. With the recipient count limit 510 set to five, the message 204 having the total recipient count 412 of FIG. 4 of five or less will be received by the message recipient 208.

The recipient correlation limit 512 represents the required amount of similarity amongst unique destinations of the message 204 for accepting the message 204. For example, the message 204 that has one receipt as the message recipient 208 or has the recipient correlation 414 of FIG. 4 equivalent or higher than the recipient correlation limit 512 will be received. For example, if the recipient correlation limit 512 is set to seven from a scale of one to ten, only the message 204 having the recipient correlation 414 of seven to ten will be received.

The content filter item 514 identifies what must not be in the message 204 for the message 204 to be received. For example, the content filter item 514 can be certain words or phrases, hyperlinks in general, pictures or recordings, or combination thereof. The content filter item 514 can be compared against the message content 212 of FIG. 2. Detailed use of the content filter item 514 will be discussed below.

The content correlation limit 516 requires the message content 212 of FIG. to have a certain amount of similarity within the message content 212 of FIG. 2 for receiving the message 204. The message 204 that has the content correlation 416 of FIG. 4 equivalent or higher than the content correlation limit 516 will be received. For example, if the content correlation limit 516 is set to seven from a scale of one to ten, only the message 204 having the content correlation 416 of seven to ten will be received.

Figure 6:
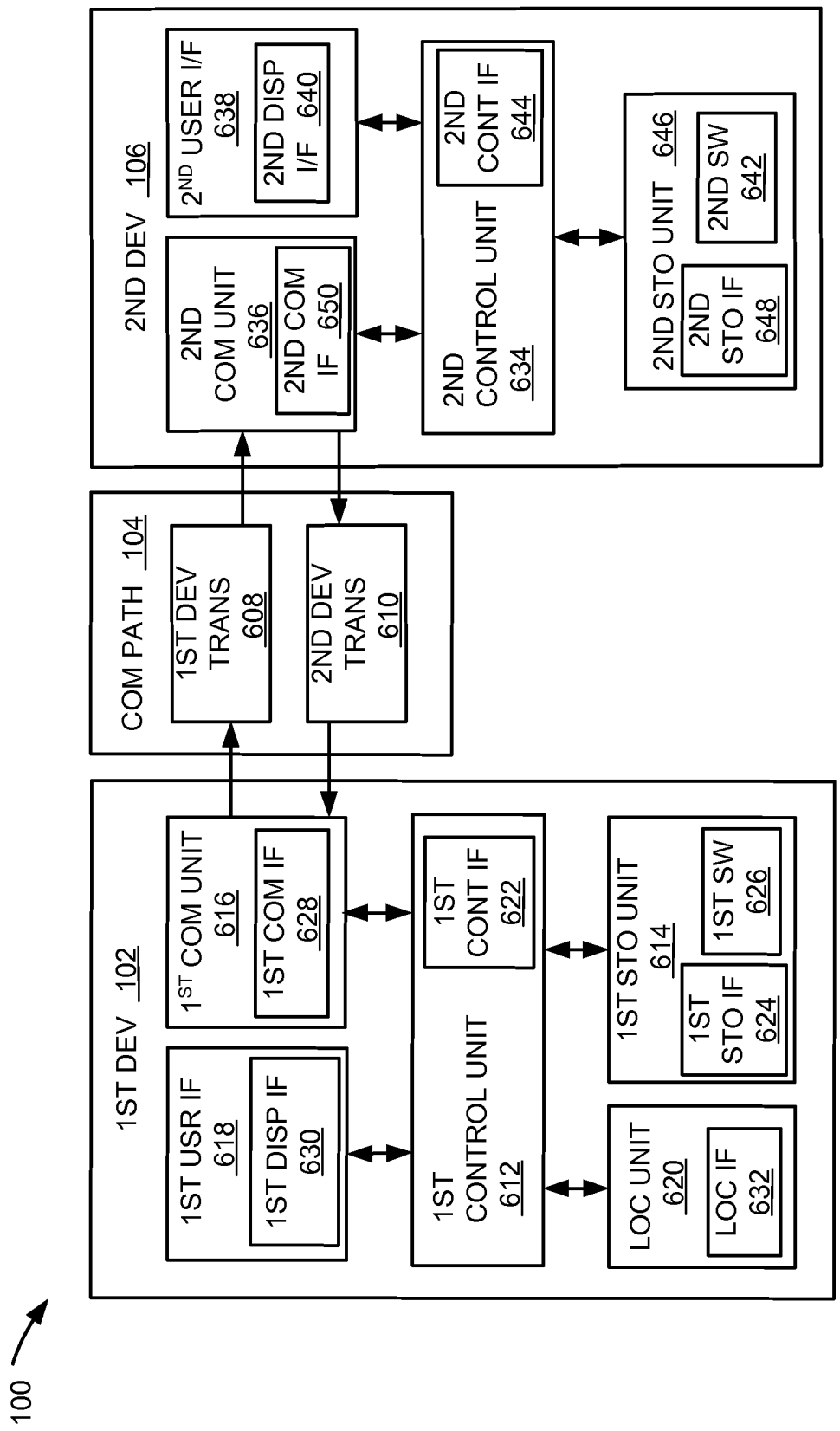
FIG. 6 is an exemplary block diagram of the communication system.

Referring now to FIG. 6, therein is shown an exemplary block diagram of the communication system 100. The communication system 100 can include the first device 102, the communication path 104, and the second device 106.

The first device 102 can communicate with the second device 106 over the communication path 104. For example, the first device 102, the communication path 104, and the second device 106 can be the first device 102 of FIG. 1, the communication path 104 of FIG. 1, and the second device 106 of FIG. 1, respectively. The screen shot shown on the display interface 202 described in FIG. 2 can represent the screen shot for the communication system 100.

The first device 102 can send information in a first device transmission 608 over the communication path 104 to the second device 106. The second device 106 can send information in a second device transmission 610 over the communication path 104 to the first device 102.

For illustrative purposes, the communication system 100 is shown with the first device 102 as a client device, although it is understood that the communication system 100 can have the first device 102 as a different type of device. For example, the first device 102 can be a server.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 612, a first storage unit 614, a first communication unit 616, a first user interface 618, and a location unit 620. The first device 102 can be similarly described by the first device 102. The first control unit 612 can include a first control interface 622. The first storage unit 614 can include a first storage interface 624.

The first control unit 612 can execute a first software 626 to provide the intelligence of the communication system 100. The first control unit 612 can operate the first user interface 618 to display information generated by the communication system 100. The first control unit 612 can also execute the first software 626 for the other functions of the communication system 100, including receiving location information from the location unit 620. The first control unit 612 can further execute the first software 626 for interaction with the communication path 104 of FIG. 1 via the first communication unit 616.

The first control unit 612 can be implemented in a number of different manners. For example, the first control unit 612 can be a processor, an embedded processor, a microprocessor, a hardware control logic, a hardware finite state machine (FSM), a digital signal processor (DSP), or a combination thereof.

The first control unit 612 can include a first control interface 622. The first control interface 622 can be used for communication between the first control unit 612 and other functional units in the first device 102. The first control interface 622 can also be used for communication that is external to the first device 102.

The first control interface 622 can receive information from the other functional units or from external sources, or can transmit information to the other functional units or to external destinations. The external sources and the external destinations refer to sources and destinations external to the first device 102.

The first control interface 622 can be implemented in different ways and can include different implementations depending on which functional units or external units are being interfaced with the first control interface 622. For example, the first control interface 622 can be implemented with a pressure sensor, an inertial sensor, a microelectromechanical system (MEMS), optical circuitry, waveguides, wireless circuitry, wireline circuitry, or a combination thereof.

The first storage unit 614 can store a first software 626. The first storage unit 614 can also store the relevant information, such as advertisements, points of interest (POI), navigation routing entries, or any combination thereof.

The first storage unit 614 can be a volatile memory, a nonvolatile memory, an internal memory, an external memory, or a combination thereof. For example, the first storage unit 614 can be a nonvolatile storage such as nonvolatile random access memory (NVRAM), Flash memory, disk storage, or a volatile storage such as static random access memory (SRAM).

The first storage unit 614 can include a first storage interface 624. The first storage interface 624 can be used for communication between the location unit 620 and other functional units in the first device 102. The first storage interface 624 can also be used for communication that is external to the first device 102.

The first storage interface 624 can receive information from the other functional units or from external sources, or can transmit information to the other functional units or to external destinations. The external sources and the external destinations refer to sources and destinations external to the first device 102.

The first storage interface 624 can include different implementations depending on which functional units or external units are being interfaced with the first storage unit 614. The first storage interface 624 can be implemented with technologies and techniques similar to the implementation of the first control interface 622.

The first communication unit 616 can enable external communication to and from the first device 102. For example, the first communication unit 616 can permit the first device 102 to communicate with the second device 106 of FIG. 1, an attachment, such as a peripheral device or a computer desktop, and the communication path 104.

The first communication unit 616 can also function as a communication hub allowing the first device 102 to function as part of the communication path 104 and not limited to be an end point or terminal unit to the communication path 104. The first communication unit 616 can include active and passive components, such as microelectronics or an antenna, for interaction with the communication path 104.

The first communication unit 616 can include a first communication interface 628. The first communication interface 628 can be used for communication between the first communication unit 616 and other functional units in the first device 102. The first communication interface 628 can receive information from the other functional units or can transmit information to the other functional units.

The first communication interface 628 can include different implementations depending on which functional units are being interfaced with the first communication unit 616. The first communication interface 628 can be implemented with technologies and techniques similar to the implementation of the first control interface 622.

The first user interface 618 allows a user (not shown) to interface and interact with the first device 102. The first user interface 618 can include an input device and an output device. Examples of the input device of the first user interface 618 can include a keypad, a touchpad, soft-keys, a keyboard, a microphone, or any combination thereof to provide data and communication inputs.

The first user interface 618 can include a first display interface 630. Examples of the output device of the first user interface 618 can include the first display interface 630. The first display interface 630 can include a display, a projector, a video screen, a speaker, or any combination thereof.

The location unit 620 can generate location information, current heading, and current speed of the first device 102, as examples. The location unit 620 can be implemented in many ways. For example, the location unit 620 can function as at least a part of a global positioning system (GPS), an inertial navigation system, a cellular-tower location system, a pressure location system, or any combination thereof.

The location unit 620 can include a location interface 632. The location interface 632 can be used for communication between the location unit 620 and other functional units in the first device 102. The location interface 632 can also be used for communication that is external to the first device 102.

The location interface 632 can receive information from the other functional units or from external sources, or can transmit information to the other functional units or to external destinations. The external sources and the external destinations refer to sources and destinations external to the first device 102.

The location interface 632 can include different implementations depending on which functional units or external units are being interfaced with the location unit 620. The location interface 632 can be implemented with technologies and techniques similar to the implementation of the first control unit 612.

For illustrative purposes, the first device 102 is shown with the partition having the first control unit 612, the first storage unit 614, the first user interface 618, the first communication unit 616, and the location unit 620 although it is understood that the communication system 100 can have a different partition. For example, the first software 626 can be partitioned differently such that some or all of its function can be in the first control unit 612, the location unit 620, and the first communication unit 616. Also, the first device 102 can include other functional units not shown in FIG. 6 for clarity.

The functional units in the first device 102 can work individually and independently of the other functional units. The first device 102 can work individually and independently from the second device 106 and the communication path 104.

The second device 106 can be optimized for implementing the present invention in a multiple device embodiment with the first device 102. The second device 106 can provide the additional or higher performance processing power compared to the first device 102. The second device 106 can include a second control unit 634, a second communication unit 636, and a second user interface 638.

The second user interface 638 allows a user (not shown) to interface and interact with the second device 106. The second user interface 638 can include an input device and an output device. Examples of the input device of the second user interface 638 can include a keypad, a touchpad, soft-keys, a keyboard, a microphone, or any combination thereof to provide data and communication inputs. Examples of the output device of the second user interface 638 can include a second display interface 640. The second display interface 640 can include a display, a projector, a video screen, a speaker, or any combination thereof.

The second control unit 634 can execute a second software 642 to provide the intelligence of the second device 106 of the communication system 100. The second software 642 can operate in conjunction with the first software 626. The second control unit 634 can provide additional performance compared to the first control unit 612.

The second control unit 634 can operate the second user interface 638 to display information. The second control unit 634 can also execute the second software 642 for the other functions of the communication system 100, including operating the second communication unit 636 to communicate with the first device 102 over the communication path 104.

The second control unit 634 can be implemented in a number of different manners. For example, the second control unit 634 can be a processor, an embedded processor, a microprocessor, a hardware control logic, a hardware finite state machine (FSM), a digital signal processor (DSP), or a combination thereof.

The second control unit 634 can include a second controller interface 644. The second controller interface 644 can be used for communication between the second control unit 634 and other functional units in the second device 106. The second controller interface 644 can also be used for communication that is external to the second device 106.

The second controller interface 644 can receive information from the other functional units or from external sources, or can transmit information to the other functional units or to external destinations. The external sources and the external destinations refer to sources and destinations external to the second device 106.

The second controller interface 644 can be implemented in different ways and can include different implementations depending on which functional units or external units are being interfaced with the second controller interface 644. For example, the second controller interface 644 can be implemented with a pressure sensor, an inertial sensor, a microelectromechanical system (MEMS), optical circuitry, waveguides, wireless circuitry, wireline circuitry, or a combination thereof.

A second storage unit 646 can store the second software 642. The second storage unit 646 can also store the relevant information, such as advertisements, points of interest (POI), navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the communication system 100 is shown with the second storage unit 646 as a single hierarchy storage system, although it is understood that the communication system 100 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as nonvolatile random access memory (NVRAM), Flash memory, disk storage, or a volatile storage such as static random access memory (SRAM).

The second storage unit 646 can include a second storage interface 648. The second storage interface 648 can be used for communication between the location unit 620 and other functional units in the second device 106. The second storage interface 648 can also be used for communication that is external to the second device 106.

The second storage interface 648 can receive information from the other functional units or from external sources, or can transmit information to the other functional units or to external destinations. The external sources and the external destinations refer to sources and destinations external to the second device 106.

The second storage interface 648 can include different implementations depending on which functional units or external units are being interfaced with the second storage unit 646. The second storage interface 648 can be implemented with technologies and techniques similar to the implementation of the second controller interface 644.

The second communication unit 636 can enable external communication to and from the second device 106. For example, the second communication unit 636 can permit the second device 106 to communicate with the first device 102 over the communication path 104.

The second communication unit 636 can also function as a communication hub allowing the second device 106 to function as part of the communication path 104 and not limited to be an end point or terminal unit to the communication path 104. The second communication unit 636 can include active and passive components, such as microelectronics or an antenna, for interaction with the communication path 104.

The second communication unit 636 can include a second communication interface 650. The second communication interface 650 can be used for communication between the second communication unit 636 and other functional units in the second device 106. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second controller interface 644.

The first communication unit 616 can couple with the communication path 104 to send information to the second device 106 in the first device transmission 608. The second device 106 can receive information in the second communication unit 636 from the first device transmission 608 of the communication path 104.

The second communication unit 636 can couple with the communication path 104 to send information to the first device 102 in the second device transmission 610. The first device 102 can receive information in the first communication unit 616 from the second device transmission 610 of the communication path 104. The communication system 100 can be executed by the first control unit 612, the second control unit 634, or a combination thereof.

For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 106 can include other functional units not shown in FIG. 6 for clarity.

The functional units in the second device 106 can work individually and independently of the other functional units. The second device 106 can work individually and independently from the first device 102 and the communication path 104.

For illustrative purposes, the communication system 100 is described by operation of the first device 102 and the second device 106. It is understood that the first device 102 and the second device 106 can operate any of the modules and functions of the communication system 100. For example, the first device 102 is described to operate the location unit 620, although it is understood that the second device 106 can also operate the location unit 620.

Figure 7:
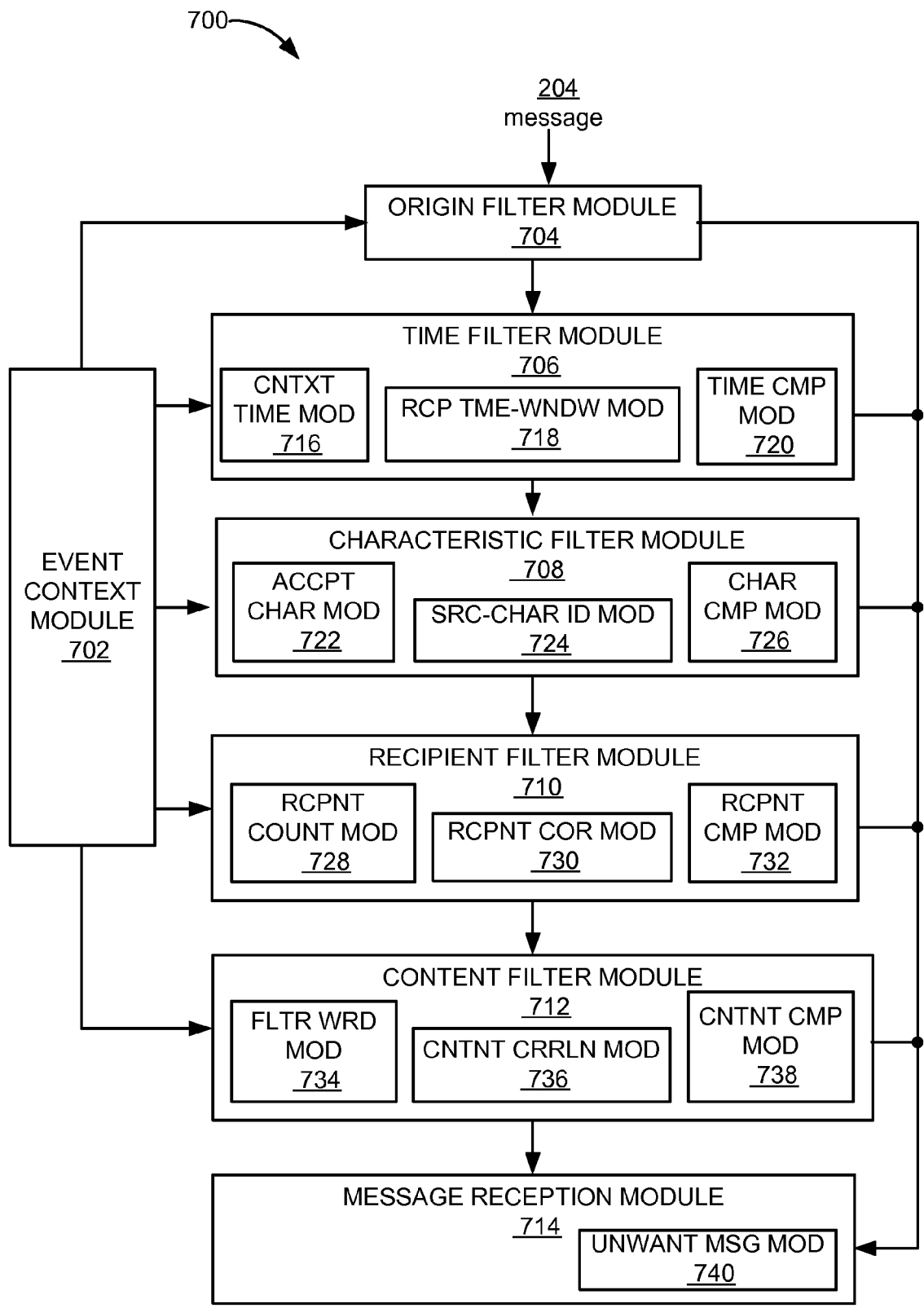
FIG. 7 is a detailed view of the communication system.

Referring now to FIG. 7, therein is shown a detailed view of the communication system 100. The communication system 100 can include an event context module 702, an origin filter module 704, a time filter module 706, a characteristic filter module 708, a recipient filter module 710, a content filter module 712, and a message reception module 714.

The event context module 702 can be coupled to the origin filter module 704, the time filter module 706, and the content filter module 712. The origin filter module 704 can be coupled to the time filter module 706, which can be coupled to the characteristic filter module 708. The characteristic filter module 708 can be coupled to the recipient filter module 710, which can be coupled to the content filter module 712. The content filter module 712 can be coupled to the message reception module 714.

The event context module 702 can establish the event context 310 of FIG. 3 for receiving the message 204. The event context module 702 can establish the event context 310 by searching the calendar event 308 of FIG. 3 for an associated item, such as the event location 312 of FIG. 3 or the event time period 314 of FIG. 3, and comparing it to a pre-determined list. For example, the title "Lunch Meeting" can be defined in a pre-determined list as being part of the event context 310 labeled Self-Improvement.

The event context 310 can also be assigned to the calendar event 308 using a pre-determined list, having categories such as self improvement, school event, tradeshow, or combination thereof. The event context module 702 can search the calendar event 308 for the event context 310 that is pre-defined by the user or by the communication system 100.

The event context module 702 can also establish the event context 310 if the calendar event 308 contains designated words, characters, file types, or combination thereof. For example, the event context module 702 can recognize "Lunch Meeting" as the event context 310.

If no key words or types are recognized, the event context module 702 can establish the title of the meeting as the event context 310. The event context module 702 can then pass the event context 310 and the associated items, such as the event time period 314 of FIG. 3 or the event location 312 of FIG. 3, to other modules aforementioned.

The event context module 702 can utilize the second control unit 634 of FIG. 6 to establish the event context 310. The event context module 702 can store and access the event context 310 using the second storage unit 646 of FIG. 6 through the communication path 104 of FIG. 6.

The origin filter module 704 determines whether the message 204 is acceptable based on the message origination point 404 of FIG. 4, the sender location 406 of FIG. 4, or a combination thereof. The operations for the origin filter module 704 will be discussed more in detail below. The origin filter module 704 can notify the message reception module 714 if the message 204 originated within the geofence 402 of FIG. 4.

The time filter module 706 determines whether the message 204 is acceptable based on the message sent time 210 of FIG. 2. The time filter module 706 can include a context time module 716, a reception time-window module 718, and a time comparator module 720.

The context time module 716 determines a period of time, relative to the event context 310, when the message 204 can be received. The context time module 716 can receive the event context 310 and the event time period 314 from the event context module 702. The context time module 716 can define a time period for comparing against the message sent time 210. The details of the comparison will be discussed in detail below.

The context time module 716 establishes the reception time period 502 of FIG. 5 based on the event context 310. The context time module 716 can establish the reception time period 502 by selecting a time period extending before and after the event time period 314 or select a pre-defined time period to set the reception time period 502.

The amount of time added to the event time period 314 or selected can be based on the event context 310. For example, the reception time period 502 corresponding to the event context 310 of Self-Improvement may be defined as an hour before and none after, or as after-work hours.

The context time module 716 can also establish the reception time period 502 based on user preference, past history, or combination thereof. For example, the context time module 716 can suggest the reception time period 502 of the calendar event 308 that is similar to the event context 310, which has occurred in the past. The context time module 716 can pass the established the reception time period 502 to the reception time-window module 718 to be set.

The context time module 716 can determine the calendar event 308 to be similar to the event context 310 if the majority of the words in the title are the same. The context time module 716 can also determine similarity if the calendar event 308 occurs at nearly the same time of the day, week, month, or year, or at the same location, or combination thereof as the event context 310.

The context time module 716 can also set the reception time period 502 by notifying the user of the communication system 100 of the event context 310 and dynamically querying the user to select the reception time period 502. After the reception time period 502 is set, the context time module 716 stores the reception time period 502.

The context time module 716 can utilize the second control unit 634 to select the reception time period 502. The context time module 716 can then store the reception time period 502 in the second storage unit 646 through the communication path 104.

The reception time-window module 718 sets the reception time period 502. The reception time-window module 718 can set the reception time period 502 by prompting the user or the communication system 100 for approval. In the absence of contextual inputs, the reception time-window module 718 can set the reception time period 502 by allowing the user or the communication system 100 to define a time period for comparing against the message sent time 210. The details for comparing will be discussed in detail below.

Also, the reception time-window module 718 defines a time period based on user preference, past history, or combination thereof. Once a period of time is defined, the reception time-window module 718 can store the time period as the reception time period 502.

The reception time-window module 718 can utilize the second control unit 634 to select the reception time period 502. The reception time-window module 718 can store the reception time period 502 in the second storage unit 646 through the communication path 104.

The time comparator module 720 determines whether the message 204 was sent within the time window defined by the reception time period 502. The time comparator module 720 compares the message sent time 210 of FIG. 2 to the reception time period 502. The time comparator module 720 can notify the message reception module 714 if the message 204 arrived within the reception time period 502.

The message 204 can be considered to have arrived within the reception time period 502 if the message 204 arrives at the communication system 100 at a time within the reception time period 502. For example, the message 204 arriving at 11:25 am arrived within the reception time period 502 if the reception time period 502 is from 11:00 am to 12:30 pm.

The message 204 can also be considered to have been sent within the reception time period 502 when the message sent time 210 is greater than the lower boundary and less than the upper boundary of the reception time period 502. For example, the message 204 with the message sent time 210 of 12:01 pm is within the reception time period 502 spanning from 11:00 am to 12:30 pm. The time comparator module 720 can notify the message reception module 714 if the message 204 was sent within the reception time period 502.

The time comparator module 720 can use the communication path 104, along with the second storage unit 646 to access the reception time period 502. The time comparator module 720 can use the second control unit 634 to make the comparison.

The characteristic filter module 708 determines the acceptability of the message 204 based on the source characteristic 410 of FIG. 4. The characteristic filter module 708 searches the pre-defined characteristic set 508 of FIG. 5 for the source characteristic 410.

The message 204 can be determined as acceptable when the message 204 has the source characteristic 410 included in the pre-defined characteristic set 508. The characteristic filter module 708 can include an acceptable characteristic module 722, a source-characteristic identifier module 724, and a characteristic comparator module 726.

The acceptable characteristic module 722 determines the characteristics required of the message sender 206 before the message 204 can be received. The acceptable characteristic module 722 establishes the pre-defined characteristic set 508. The acceptable characteristic module 722 can establish by selecting the source characteristic 410 from a pre-defined list of the source characteristic 410 to build the pre-defined characteristic set 508.

For example, the acceptable characteristic module 722 can select the job title or the gender of the message sender 206 from within a pre-defined list as the basis for receiving the message. In such case, the acceptable characteristic module 722 can require receiving the message 204 only from a sales representative or only from women executives.

The acceptable characteristic module 722 can also establish the pre-defined characteristic set 508 by selecting the pre-defined characteristic set 508 based on the event context 310. The acceptable characteristic module 722 can select the pre-defined characteristic set 508 from the characteristics stored in the calendar event 308, which has occurred in the past and is similar to the event context 310.

The acceptable characteristic module 722 can determine the calendar event 308 to be similar to the event context 310 if the majority of the words in the title are the same. The acceptable characteristic module 722 can also determine similarity if the calendar event 308 occurs at nearly the same time of the day, week, month, or year, or at the same location, or combination thereof as the event context 310.

For example, the acceptable characteristic module 722 can suggest job title being at least sales manager as the pre-defined characteristic set 508 for a trade show based on previous selections for tradeshows. Also for example, the acceptable characteristic module 722 can suggest unmarried women as the pre-defined characteristic set 508 for a club meeting, if a matching pattern exists between the suggested selection and previous events of a personal nature.

The acceptable characteristic module 722 can use the second control unit 634 for searching and recalling previous selections. The acceptable characteristic module 722 can use the second storage unit 646 for storing the pre-defined characteristic set 508.

The source-characteristic identifier module 724 identifies the source characteristic 410 of the message sender 206. The source characteristic 410 may be included in the message 204. The source-characteristic identifier module 724 can search the message 204 and return the source characteristic 410 included.

The source-characteristic identifier module 724 can also search the publicly available profile of the message sender 206. The source-characteristic identifier module 724 can search the internet, the user's address book, or available database for the message sender 206. The source-characteristic identifier module 724 can then extract the source characteristic 410 that is of relevance, belonging to the message sender 206.

For example, the source-characteristic identifier module 724 can search for the company website and the internet networking websites having the name of the message sender 206. The source-characteristic identifier module 724 can also search the user's address book for the name of the message sender 206. Once the message sender 206 is located, the source-characteristic identifier module 724 can extract the job title, gender, job sector, age, other items, or combination thereof as the source characteristic 410.

The source-characteristic identifier module 724 can use the second control unit 634, the second communication unit 636 of FIG. 6, and the communication path 104 for identifying the source characteristic 410. The source-characteristic identifier module 724 can use the second storage unit 646 to store it.

The characteristic comparator module 726 matches the source characteristic 410 to the pre-defined characteristic set 508. The characteristic comparator module 726 can search the acceptable characteristic module 722 for the output of the source-characteristic identifier module 724.

The source characteristic 410 matches the pre-defined characteristic set 508 when the pre-defined characteristic set 508 includes the same value, character, category, type, or combination thereof as that of the source characteristic 410. The characteristic comparator module 726 can notify the message reception module 714 when there is a match.

The characteristic comparator module 726 can use the second control unit 634 for accessing the source characteristic 410 and the pre-defined characteristic set 508. The characteristic comparator module 726 can also use the second control unit 634 for comparing the two.

The recipient filter module 710 determines the acceptability of the message 204 based on the number of and the correlation between the unique destinations of the message 204. The recipient filter module 710 can include a recipient counter module 728, a recipient correlation module 730, and a recipient comparator module 732.

The recipient counter module 728 determines the number of recipients of the message 204 for the purpose of identifying mass communications. The recipient counter module 728 determines the total recipient count 412 of FIG. 4.

The recipient counter module 728 can determine the total recipient count 412 by counting the number of times the message 204 was sent to unique destinations. For example, if the message 204 is intended to go to two names, three phone numbers, and one email address, the recipient counter module 728 can determine the total recipient count 412 to be six. The recipient counter module 728 can use the first control unit 612 of FIG. 6 or the second control unit 634, for determining the total recipient count 412.

The recipient correlation module 730 evaluates the recipient correlation 414 of FIG. 4. The recipient correlation module 730 can evaluate the recipient correlation 414 by recognizing the source characteristic 410 or the event context 310 shared in common across unique destinations of the message 204.

When the total recipient count 412 is one, the recipient correlation 414 can be designated as being high since there is no other intended recipient. The recipient correlation 414 can also be high when multiple recipients have the event context 310 and the source characteristic 410 that are identical across recipients. The recipient correlation 414 can be low when there are multiple recipients for the message 204 and each recipient has the source characteristic 410 and the event context 310 different from other recipients.

For example, the recipient correlation 414 can be high when the message 204 is sent to five women executives that are attending the same leadership seminar. Also, for example, the recipient correlation 414 can be low when the message 204 is sent to a male sales representative attending a trade show and a housewife hosting a party.

The recipient correlation 414 can be the total number of the source characteristic 410, the event context 310, or combination thereof shared between unique destinations of the message 204. The recipient correlation 414 can also be the result of weighted or logically parsed calculation of the source characteristic 410 or the event context 310.

For example, the recipient correlation 414 can be low if not all of the recipients share the event context 310, or high if all but one of the destinations shares the event context 310 but none of the source characteristic 410. The recipient correlation module 730 can use the first control unit 612 or the second control unit 634, for evaluating the recipient correlation 414.

The recipient comparator module 732 determines if the message 204 is a mass message or if it the destinations have enough similarities to be received. The recipient comparator module 732 compares the total recipient count 412 to the recipient count limit 510. The recipient comparator module 732 also compares the recipient correlation 414 to the recipient correlation limit 512.

The recipient comparator module 732 determines whether the message 204 has the total recipient count 412 that is lesser than or equal to the recipient count limit 510, and the recipient correlation 414 that is lesser than or equal to the recipient correlation limit 512. The recipient comparator module 732 can notify the message reception module 714 when the total recipient count 412 and the recipient correlation 414 satisfy the respective limits.

The recipient comparator module 732 can use the second control unit 634 for accessing the total recipient count 412, the recipient count limit 510, the recipient correlation 414, and the recipient correlation limit 512. The recipient comparator module 732 can use the second control unit 634 for also comparing.

The content filter module 712 determines the acceptability of the message 204 based on the message content 212. The content filter module 712 can include a filter word module 734, a content correlation module 736 and a content comparator module 738.

The filter word module 734 identifies the content filter item 514 of FIG. 5 based on the event context 310. The filter word module 734 can select the content filter item 514 from a pre-defined list of the content filter item 514. For example, the filter word module 734 can select from a list of words and file types including "vegetarian" and file type "pictures" as the content filter item 514 for a cattle rancher convention.

The content filter item 514 can be linked to the event context 310. The link between the content filter item 514 and the event context 310 can be provided by an external source, such as internet mail service providers or software vendors. The external sources can provide updates to the content filter item 514 to include new words or file types linked to the event context 310.

The content filter item 514 can also be linked to the event context 310 by the end user or the communication system 100. The user or the communication system 100 can determine words, characters, numbers, file types, or combination thereof as the content filter item 514 linked to the event context 310.

The filter word module 734 can also update the content filter item 514 belonging to certain contexts based on the content filter item 514 previously selected for the event context 310. For example, the filter word module 734 can suggest the word "vegetarian" as a filter word if the user selected "vegetarian" as the content filter item 514 for the previous year's cattle rancher convention or other events having the event context 310 of similar nature.

The filter word module 734 can use the second control unit 634 for searching and recalling previous selections. The filter word module 734 can also use the second storage unit 646 for storing the content filter item 514.

The content correlation module 736 determines if the content is a combination of random items, commonly found in messages designed to bypass common filters, or if the message 204 is meaningful. The content correlation module 736 evaluates the content correlation 416 of FIG. 4.

The content correlation module 736 can evaluate the content correlation 416 by evaluating the components of the message content 212 of FIG. 2. The components of the message content 212 can be compared to each other for similarity or relatedness. The components of the message content 212 can be considered similar or related if one component is repeated more than others, if one component is an accepted modifier of another, or combination thereof.

For example, the words "fire," "wood," and "burn" would be closely related, but "fire" and "email" would not be related. The accepted relationship between components, such as common adverb and verb pairings, can be defined by an external source, such as the World Wide Web or the software developer, or by the user or the communication system 100.

The content correlation 416 can be the total number or percentage of related components or the highest count of components, such as words or pictures, which share a similar relation within the message content 212. The content correlation module 736 can access commonly used components and the correlation between them to determine the content correlation 416.

The content correlation module 736 can use the first control unit 612 or the second control unit 634, for evaluating the recipient correlation 414. The content correlation module 736 can also use the second storage unit 646 for the database.

The content comparator module 738 searches the message content 212 for the content filter item 514. The content comparator module 738 determines whether the message 204 has the content filter item 514 that satisfies conditions, such as "must have" or "must not include." When the message 204 satisfies conditions, the content comparator module 738 can notify the message reception module 714 for the purposes of receiving, determined by the message reception module 714.

The content comparator module 738 also compares the content correlation 416 to the content correlation limit 516 of FIG. 5. The content comparator module determines whether the content correlation 416 is greater than or equal to the content correlation limit 516. When the content correlation 416 is higher than the content correlation limit 516, the content comparator module 738 can flag the message 204 for the purposes of receiving, determined by the message reception module 714.

The content comparator module 738 can use the second control unit 634 for accessing the content correlation 416, the content correlation limit 516, the message content 212, and the content filter item 514. The content comparator module 738 can also use the second control unit 634 for comparing and searching.

The message reception module 714 receives the message 204 originating within the geofence 402 and within the reception time period 502. The message reception module 714 can include an unwanted message module 740.

The message reception module 714 receives the message 204 by storing the message 204 in the message reception module 714, displaying a notification of the arrival of the message 204, and allowing access to the message content 212. Once the message 204 is received, the user can access the message 204 and all of the components associated with the message 204, such as the message content 212.

The message reception module 714 can receive the message 204 when the origin filter module 704 and the time comparator module 720 notify the message reception module 714. The origin filter module 704 notifies the message reception module 714 if the message 204 originated within the geofence 402. The time comparator module 720 notifies the message reception module 714 if the message originated within the reception time period 502. The message reception module 714 can thus receive the message 204 satisfying the temporal and spatial context.

The message reception module 714 can also receive the message 204 when the characteristic comparator module 726, the recipient comparator module 732, or the content comparator module 738 notifies the message reception module 714. The message reception module 714 can receive the message 204 when the message 204 satisfies the requirements.

The message reception module 714 can assign a Boolean value, weighted values, or combination thereof to the outputs of different modules, such as the origin filter module 704 or the content comparator module 738. For example, the message reception module 714 may require that the message 204 must be sent within the geofence 402 but require the message sender 206 to be a sales manager instead of requiring a certain arrival time.

The unwanted message module 740 isolates the message 204 that is not received. The unwanted message module 740 isolates the message 204 by denying access to the message content 212. The user or the communication system 100 can move the message 204 out of the unwanted message module 740 to access the message content 212.

The message reception module 714 can use the first control unit 612 or the second control unit 634 for accessing the module outputs. The message reception module 714 can also use the first storage unit 614 of FIG. 6 or the second storage unit 646 for receiving the message 204.

The communication system 100 can be partitioned between the first device 102 of FIG. 6 and the second device 106 of FIG. 6. For example, the communication system 100 can be partition into the functional units of the first device 102, the second device 106, or a combination thereof. The communication system 100 can also be implemented as additional functional units in the first device 102, the second device 106, or a combination thereof.

It has been discovered that the present invention provides a communication system with temporal and spatial anti-SPAM mechanism for receiving desired messages based on context-relevant spatial and temporal boundaries. The origin filter module 704 gives rise to the spatial mechanism and the time filter module 706 provides the temporal mechanism for receiving messages. The contextual basis for filtering message provides for accurate and efficient separation of desired messages from SPAM.

The physical transformation of the geofence 402 or the message 204 results in movement in the physical world by enabling or blocking communication with people and possibly guiding their movements in the real world. For example, people using the first device 102 or vehicles may be guided by the operation of the communication system 100. The movement of people in the real world can be fed back to the communication system 100 to further operate the communication system 100 enable or block communication.

Thus, it has been discovered that the communication system with temporal and spatial anti-SPAM mechanism of the present invention furnishes important and heretofore unknown and unavailable solutions, capabilities, and functional aspects for filtering out SPAM.

The communication system 100 describes the module functions or order as an example. The modules can be partitioned differently. For example, the various modules can evaluate the message 204 simultaneously, rather than sequentially as described above, for determining whether the message 204 should be received. Also for example, the various comparator modules can belong to the message reception module 714. Each of the modules can operate individually and independently of the other modules.

Figure 8:
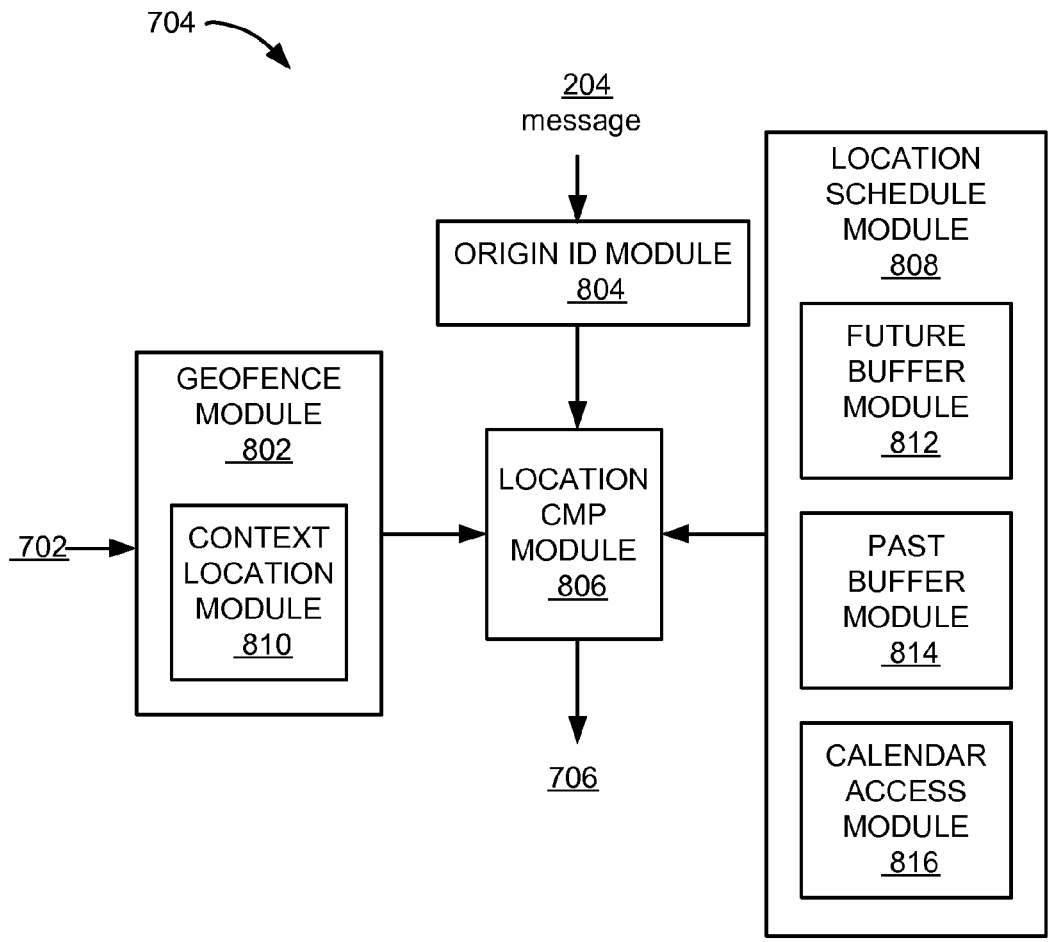
FIG. 8 is a detailed view of the origin filter module of FIG. 7.

Referring now to FIG. 8, therein is shown a detailed view of the origin filter module 704 of FIG. 7. The origin filter module 704 determines whether the message 204 is acceptable based on the message origination point 404 of FIG. 4 or the sender location 406 of FIG. 4. The origin filter module 704 can include a geofence module 802, an origin identifier module 804, a location comparator module 806, and a location schedule module 808.

The geofence module 802 establishes the geofence 402 of FIG. 4. The geofence module 802 can establish the geofence 402 based on user input or the event context 310 of FIG. 3.

The geofence module 802 can select an area for evaluating receiving the message 204. For example, the geofence module 802 can select a country and a state, a city, or to enclose a region on a map using the first user interface 618 of FIG. 6. The outer boundaries of the selected region can be the geofence 402.

The geofence module 802 can include a context location module 810. The context location module 810 establishes the geofence 402 based on the event context 310. The context location module 810 can select an area in relation to the event location 312 of FIG. 3.

For example, the context location module 810 can input a radius to define a circular area with the event location 312 as the center, or to select the desired surrounding city blocks. Also, for example, the context location module 810 can display the map of area around and including the event location 312, and draw a boundary around the event location 312 to establish the geofence 402.

The geofence module 802 can use the first control unit 612 of FIG. 6, the second control unit 634 of FIG. 6, or combination thereof for establishing the geofence 402. The geofence module 802 can also use the first storage unit 614 of FIG. 6, the second storage unit 646 of FIG. 6, or combination thereof for storing the geofence.

The origin identifier module 804 retrieves the message origination point 404 of FIG. 4 of the message 204. The message 204 can include the message origination point 404. In such case, the origin identifier module 804 can retrieve the message origination point 404 from the message 204.

If the message origination point 404 is not included in the message 204, the origin identifier module 804 can retrieve the message origination point 404 by tracing backwards across time the transmission course of the message 204. For example, the origin identifier module 804 can trace the signal repeaters, cell towers, routers, gateways, switches, or combination thereof to find the message origination point 404.

The origin identifier module 804 can also retrieve the sender location 406 of FIG. 4. When the message sent time 210 of FIG. 2 is near the current time, such as less than 30 seconds or within the same day, the message origination point 404 can be given the value equivalent to the sender location 406. For example, if the message sent time 210 is less than a minute, the origin identifier module 804 can determine the message origination point 404 to be equivalent to the sender location 406.

The origin identifier module 804 can require the sender location 406 to be within a certain distance to the message origination point 404 to prevent message spoofing. For example, the communication system 100 can restrict receiving messages to when the sender location 406 and the message origination are less than 20 miles apart. Spoofed messages with fictitious end points that are not the entry points nearest to the sender location 406 can be avoided.

The origin identifier module 804 can also verify the validity of the message sender 206, such as name, address, number, return address, or combination thereof. The origin identifier module 804 can verify by determining if the message sender 206 has ever sent or received a message.

The origin identifier module 804 can also search for whether the address, number, return address, or other identification included in the message 204 has sent or received a message within a recent period of time. For example, the origin identifier module 804 can require the message sender 206 to have been active on at least one other occasion within the day period prior to when the message 204 was received. Spoofed messages with fictitious identification can be not received.

The origin identifier module 804 can use the location unit 620 of FIG. 6 for retrieving the sender location 406 of the message sender 206 of FIG. 2. The origin identifier module 804 can use the first control unit 612, the second control unit 634, or combination thereof for retrieving the message origination point 404.

The location comparator module 806 determines if the message origination point 404 is within the geofence 402. The location comparator module 806 can determine if the message origination point 404 is within the geofence 402 if the coordinates of the message origination point 404 is surrounded by the geofence 402 in all directions.

For example, the location comparator module 806 can start from a point on the geofence 402 north-east of the message origination point 404 and trace the geofence 402 in one direction until the loop is completed. If the geofence 402 encloses the message origination point 404, the message origination point 404 can be considered as being within the geofence 402.

Also, for example, the location comparator module 806 can perform a directional analysis. The location comparator module 806 can check if the coordinate of the message origination point 404 is between a pair of points in the geofence 402 lying in the same direction, such as a GPS coordinate or longitude, for all directions. The number of total direction can be determined by the coordinate system: longitude and latitude will require two directions and GPS system will require the same number of directions as intersecting satellite signals.

When the message origination point 404 is outside of the geofence 402, the location comparator module 806 can receive inputs from the location schedule module 808 regarding the past or future location of the message sender 206. The location comparator module 806 compares the source future location 318 of FIG. 3 identified within the time not exceeding the future grace period 504 of FIG. 5, and the geofence 402.

The location comparator module 806 can also compare the source prior location 316 of FIG. 3 identified within the time not exceeding the past grace period 506 of FIG. 5, and the geofence 402. The location comparator module 806 can calculate the direction and distance of the source future location 318 or the source prior location 316. The location comparator module 806 can determine if the source prior location 316 or if the source future location 318 is within the geofence 402.

The location comparator module 806 can use the second control unit 634 to calculate the direction and distance, and compare the distance. The location comparator module 806 can also use the second storage unit 646 to store the reference point, map, various locations, or the geofence 402.

The location schedule module 808 determines the source future location 318 or the source prior location 316. The location schedule module 808 can include a future buffer module 812, a past buffer module 814, and a calendar access module 816.

The future buffer module 812 determines how late the message sender 206 can be in arriving within the geofence 402 for the message 204 to be received. The future buffer module 812 sets the future grace period 504 by selecting a length of time that can be compared to the time necessary for the message sender 206 to move within the geofence 402. The message 204 can be flagged as originating within the geofence 402 if the time necessary for the message sender 206 to move within the geofence 402 is less than or equal to the future grace period 504.

The past buffer module 814 determines how long the message sender 206 can be outside of the geofence 402 before the message 204 will no longer be received. The past buffer module 814 sets the past grace period 506 by selecting a length of time that can be compared to the length of time the message sender 206 has been outside of the geofence 402. The message can be flagged as originating within the geofence 402 if the length of time the message sender 206 as been outside of the geofence 402 is less than or equal to the past grace period 506.

The future buffer module 812 and the past buffer module 814 can use the second control unit 634 to set the past grace period 506 and the future grace period 504. The future buffer module 812 and the past buffer module 814 can use the second storage unit 646 to store the past grace period 506 and the future grace period 504.

The calendar access module 816 determines the source prior location 316. The calendar access module 816 also determines the source future location 318. The calendar access module 816 can access the remote calendar 302 of FIG. 3 belonging to the message sender 206 of FIG. 2. The calendar access module 816 can determine the scheduled locations of the message sender 206 for different times of the day through the remote calendar 302.

The calendar access module 816 can determine the source prior location 316 by searching the remote calendar 302 starting with the message sent time 210 of FIG. 2. The calendar access module 816 can search backward in time for the locations of the calendar event 308 that has occurred.

The search can be limited to a length of time, not exceeding the past grace period 506. For example, when the message sent time 210 is 2:00 pm and the past grace period 506 is 30 minutes, the calendar access module 816 can start from 2:00 pm and go to 1:30 pm and search for location of the calendar event 308. The location of the calendar event 308 occurring between the past grace period 506 and the message sent time 210 can be set as the source prior location 316.

The calendar access module 816 can determine the source future location 318 by searching the remote calendar 302 starting with the message sent time 210. The calendar access module 816 can search forward in time for the locations of the calendar event 308 that will occur.

The search can be limited to the future grace period 504 length. For example, when the message sent time 210 is 1:00 pm and the future grace period 504 is 9 minutes, the calendar access module 816 can start from 2:00 pm and go to 2:10 pm and search for location of the calendar event 308. The location of the calendar event 308 occurring between the future grace period 504 and the message sent time 210 can be set as the source future location 318.

The calendar access module 816 is described as starting with the message sent time 210 and searching towards the limit, however, it is understood that the calendar access module 816 can search differently. For example, the calendar access module 816 can start from the limit and search toward the message sent time 210.

The calendar access module 816 is described as using the remote calendar 302 to determine the source prior location 316 or the source future location 318. However, it is understood that the calendar access module 816 can determine the location differently.

For example, the calendar access module 816 can utilize the sender travel route 408 of FIG. 4. The calendar access module 816 can determine the source prior location 316 by estimating where on the sender travel route 408 the message sender 206 was within the past grace period 506. The calendar access module 816 can also determine the source future location 318 by estimating where on the sender travel route 408 the message sender 206 will be within the future grace period 504.

Also, as an example, the calendar access module 816 can determine the source prior location 316 or the source future location 318 using the sender location 406. The calendar access module 816 can access the location unit 620 of the message sender 206 to find the sender location 406.

The calendar access module 816 can estimate the average speed of the message sender 206 by calculating distance over period of time. Using the average speed, the calendar access module 816 can establish a circular area with the sender location 406 as the center and the product of average speed and the past grace period 506 to determine the source prior location 316. Similar type of area can be established using the product of average speed and the future grace period 504 to determine the source future location 318.

The calendar access module 816 can use the second control unit 634 to access the remote calendar 302 and determining various locations. The calendar access module 816 can use the second storage unit 646 to store the source future location 318 and the source prior location 316.

Figure 9:
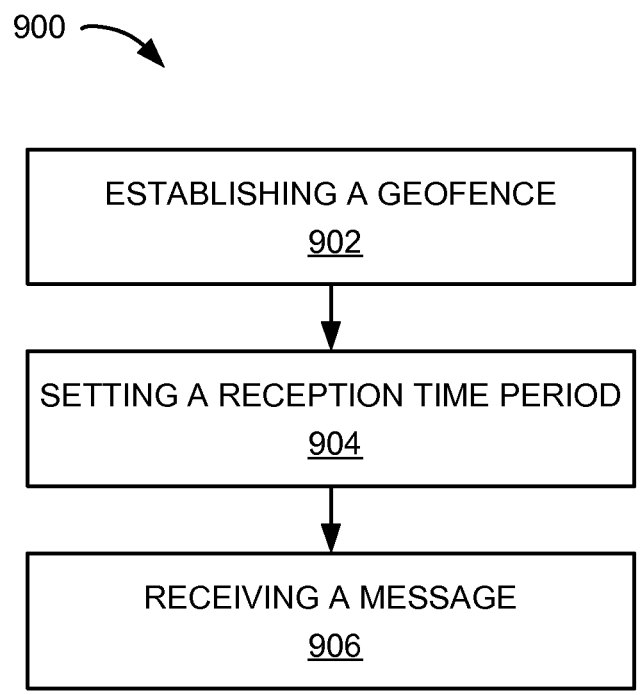
FIG. 9 is a flow chart of a method of operation of the communication system in a further embodiment of the present invention.

Referring now to FIG. 9, therein is shown a flow chart of a method 900 of operation of the communication system 100 in a further embodiment of the present invention. The method 900 includes: establishing a geofence in a block 902; setting a reception time period in a block 904; and receiving a message originating within the geofence and within the reception time period for displaying on a device in a block 906.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the a foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a communication system comprising:
    establishing an event context for receiving a message;
    establishing a geofence based on the event context for representing a region for evaluating whether the message is acceptable for a message recipient, the message sent from a message sender to the message recipient;
    setting a reception time period based on the event context for evaluating a time associated with receiving the message;
    identifying a source characteristic for uniquely identifying the message sender;
    establishing a pre-defined characteristic set for establishing requirements of the message sender for receiving the message; and
    receiving the message when the message is originated within the geofence during the reception time period, and when the source characteristic corresponds to the pre-defined characteristic set for providing the message recipient with the message for displaying on a device.

2. The method as claimed in claim 1 wherein:
    receiving the message includes receiving the message based on matching the source characteristic to the pre-defined characteristic set.

3. The method as claimed in claim 1 further comprising:
    setting a future grace period;
    determining a source future location; and
    wherein receiving the message includes:
    comparing the source future location identified within the time not exceeding the future grace period, and the geofence.

4. The method as claimed in claim 1 further comprising:
    setting a past grace period;
    determining a source prior location; and
    wherein receiving the message includes:
    comparing the source prior location identified within the time not exceeding the past grace period, and the geofence.

5. The method as claimed in claim 1 further comprising:
    determining a total recipient count; and
    wherein receiving the message includes:
    comparing the total recipient count to a recipient count limit.

6. The method as claimed in claim 1 further comprising:
    evaluating a recipient correlation; and
    wherein receiving the message includes:
    comparing the recipient correlation to a recipient correlation limit.

7. The method as claimed in claim 1 further comprising:
    evaluating a content correlation; and
    wherein receiving the message includes:
    comparing the content correlation to a content correlation limit.

8. The method as claimed in claim 1 further comprising:
    identifying a content filter item based on the event context; and
    searching a message content for the content filter item.

9. A communication system comprising:
    at least one instance of a processor;
    at least one instance of a memory, the memory storing modules including instructions for execution by the at least one instance of the processor, the memory storing:
        an event context module for establishing an event context for receiving a message,
        a geofence module for establishing a geofence based on the event context for representing a region for evaluating whether the message is acceptable for a message recipient, the message sent from a message sender to the message recipient,
        a reception time-window module, coupled to the geofence module, for setting a reception time period based on the event context for evaluating a time associated with receiving the message,
        a source-characteristic identifier module, coupled to the reception time-window module, for identifying a source characteristic for uniquely identifying the message sender,
        an acceptable characteristic module, coupled to the source-characteristic identifier module, for establishing a pre-defined characteristic set for establishing requirements of the message sender for receiving the message, and
        a message reception module, coupled to the reception time-window module, for receiving the message when the message is originated within the geofence during the reception time period, associated with the event context, and when the source characteristic corresponds to the pre-defined characteristic set for providing the message recipient with the message for displaying on a device.

10. The system as claimed in claim 9 wherein the memory includes:
    a characteristic comparator module, coupled to the acceptable characteristic module, for matching the source characteristic to the pre-defined characteristic set.

11. The system as claimed in claim 9 wherein the memory includes:
    a location comparator module, coupled to the geofence module, for comparing a source future location identified within the time not exceeding a future grace period, and the geofence;
    a future buffer module, coupled to the location comparator module, for setting the future grace period; and
    a calendar access module, coupled to the location comparator module, for determining the source future location.

12. The system as claimed in claim 9 wherein the memory includes:

a location comparator module, coupled to the geofence module, for comparing a source prior location identified within the time not exceeding a past grace period, and the geofence;

a past buffer module, coupled to the location comparator module, for setting the past grace period; and a calendar access module, coupled to the location comparator module, for determining the source prior location.

13. The system as claimed in claim 9 wherein the memory includes:

a recipient counter module, coupled to the characteristic comparator module, for determining a total recipient count; and a recipient comparator module, coupled to the characteristic comparator module, for comparing the total recipient count to a recipient count limit.

14. The system as claimed in claim 9 wherein the memory includes:

a recipient correlation module, coupled to the characteristic comparator module, for evaluating a recipient correlation; and a recipient comparator module, coupled to the characteristic comparator module, for comparing the recipient correlation to a recipient correlation limit.

15. The system as claimed in claim 9 wherein the memory includes:

a content correlation module, coupled to the event context module, for evaluating a content correlation; and a content comparator module, coupled to the event context module, for comparing the content correlation to a content correlation limit.

16. The system as claimed in claim 9 wherein the memory includes:

a filter word module, coupled to the event context module, for identifying a content filter item based on the event context; and a content comparator module, coupled to the filter word module, for searching a message content for the content filter item.

* * * * *